United States Patent [19]

Yamada

[11] Patent Number: 4,641,961
[45] Date of Patent: Feb. 10, 1987

[54] APPARATUS FOR MEASURING THE OPTICAL CHARACTERISTICS OF AN OPTICAL SYSTEM TO BE EXAMINED

[75] Inventor: Kenji Yamada, Narashino, Japan
[73] Assignee: Nippon Kogaku K. K., Tokyo, Japan
[21] Appl. No.: 519,538
[22] Filed: Aug. 1, 1983
[30] Foreign Application Priority Data Aug. 6, 1982 [JP] Japan ................................. 57-136369

[51] Int. Cl.$^4$ .............................................. G01B 9/00
[52] U.S. Cl. ..................................... 356/124; 356/127
[58] Field of Search ................................ 356/124–127

[56] References Cited

U.S. PATENT DOCUMENTS 2,640,392 6/1953 Freeman ............................. 356/125
4,410,268 10/1983 Tamaki ................................ 356/124

FOREIGN PATENT DOCUMENTS

0059480 9/1982 European Pat. Off. ............ 356/127

Primary Examiner—R. A. Rosenberger
Assistant Examiner—Crystal D. Cooper
Attorney, Agent, or Firm—Shapiro and Shapiro

[57] ABSTRACT

In an apparatus for measuring the optical characteristics of an optical system to be examined a light source determines a reference optical axis and generates a light beam that is passed through the optical system to be examined along the reference optical axis. A mask partly transmits the light beam therethrough and has a pattern comprising at least one straight line disposed off the reference optical axis in the light beam, the straight line of the pattern extending in a predetermined direction in a plane substantially orthogonal to the reference optical axis. A photosensitive detector receives the light beam passed through the optical system to be examined and the mask. The detector is fixedly disposed relative to the mask and has a substantial length in a direction substantially orthogonal to the reference optical axis and the straight line of the pattern. The detector produces an electrical signal indicative of the position of the pattern of the mask projected onto the detector in the direction of the length of the detector. A rotator provides relative rotation about the reference optical axis between the light beam passed through the optical system to be examined and the mask. A signal processor processes the electrical signal and finds the refractive characteristic of the optical system to be examined.

28 Claims, 25 Drawing Figures

APPARATUS FOR MEASURING THE OPTICAL CHARACTERISTICS OF AN OPTICAL SYSTEM TO BE EXAMINED-

BACKGROUND OF THE INVENTION

1. Field of the Invention

This invention relates to an apparatus for measuring the characteristics of an optical system such as spherical power, cylindrical power, cylindrical axis, prism power and prism axis, and more particularly to a so-called automatic lens meter for automatically measuring chiefly the refractive characteristic of spectacle lenses.

2. Description of the Prior Art

As far as automatic lens meters are concerned, various measuring methods have heretofore been proposed. Among these, a method generally proposed in recent years comprises causing a parallel light beam to enter a lens to be examined, photoelectrically detecting the inclination of the beam passed through the lens to be examined and bent by the refractive characteristic thereof, and calculating the refractive characteristic of the lens to be examined from such inclination. Various contrivances have been made in the detection of the inclination of the beam and the method of processing thereof and there are the following prior arts:

(1) Japanese Laid-open Patent Application No. 449/1977 (corresponding U.S. Pat. No. 4,007,990);

(2) Japanese Laid-open Patent Application No. 14757/1979 (corresponding U.S. Pat. No. 4,180,325);

(3) Japanese Laid-open Patent Application No. 86327/1981 (corresponding U.S. application Ser. No. 85864 filed on Oct. 18, 1979);

(4) Japanese Laid-open Patent Application No. 168140/1981 (corresponding German Patent Application No. 2934263); and (5) Japanese Laid-open Patent Application No. 29923/1982.

The problems peculiar to these prior art will hereinafter be pointed out.

In prior art (1), a projected light beam and a one-dimensional position sensing detector must be rotated in synchronism with each other and, where there is a prism power in a lens to be examined, a mechanical apparatus for compensating for this is necessary, and this leads to a complex construction and difficulty in the manufacture thereof.

In prior art (2), the number of projected light beams used for measurement is small and therefore, very high accuracy is required for the detection of the inclinations of the beams and this leads to difficulties in the manufacture and adjustment or otherwise, it is impossible to maintain the measurement accuracy high.

In prior art (3), it is necessary to rotate a linear photodiode array which is an electrical part and this leads to a problem in the manufacture. Also, where there is a prism power in the lens to be examined, calculation becomes complicated and a long processing time of the processor is required, and this is disadvantageous for quick measurement.

In prior art (4), where there is a cylindrical power in the lens to be examined, a mechanical apparatus for rotating a diode array to thereby correct the cylindrical axis is required and further, where there is a prism power in the lens to be examined, a mechanical apparatus for compensating for this is also required and thus, the construction must unavoidably be complicated to make the measuring apparatus more perfect.

In prior art (5), it is difficult to obtain a two-dimensional sensor having a sufficient resolving power and this leads a problem in the manufacture. Also, to calculate a result by using the output signal from the two-dimensional sensor, complicated calculation is necessary and this undesirably leads to complication of the operational device and lengthened processing time.

SUMMARY OF THE INVENTION

It is an object of the present invention to provide an apparatus which solves the above-noted problems.

It is another object of the present invention to provide an apparatus which is simple in construction and capable of accomplishing highly accurate measurement within a short time.

An examining apparatus in accordance with the present invention is provided with beam supply means for supplying a light beam to an optical system to be examined and determining a measuring reference optical axis, a mask for selectively limiting the light beam by a linear portion off the reference optical axis, a detector for receiving the light beam passed through the optical system to be examined and the mask, and rotating means for rotating the mask and the detector about the reference optical axis relative to the light beam passed through the optical system to be examined, whereby the refraction information of the optical system to be examined is detected from the position corresponding to the linear portion limited by the mask on the detector.

The invention will become more fully apparent from the following detailed description thereof taken in conjunction with the accompanying drawings.

DESCRIPTION OF THE PREFERRED EMBODIMENTS

Figure 1:
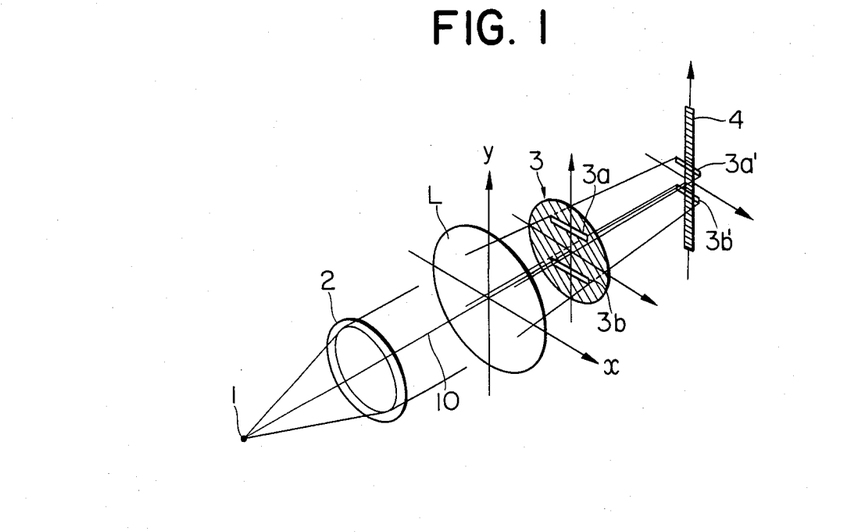
FIG. 1 is a perspective view of an optical system illustrating the principle of the present invention.
Figure 2A:
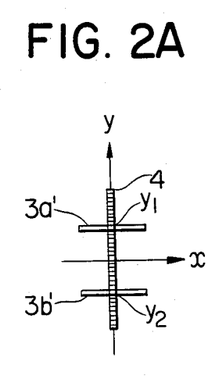
FIGS. 2A to 2C are plan views showing the positional relation between a photoarray and fringes of light, FIG. 2A referring to a case where there is no cylindrical power and no prism power in a lens to be examined, FIG. 2B referring to a case where there is no cylindrical power but there is a prism power in the lens to be examined, and FIG. 2C referring to a case where there are a cylindrical power and a prism power in the lens to be examined.
Figure 2B:
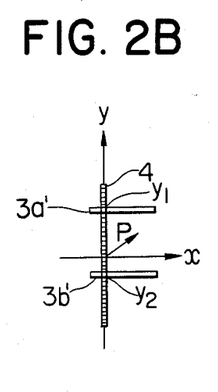

The principle of the present invention will first be described by reference to FIG. 1. The light emitted from a light source 1 comprising a light-emitting diode, a semiconductor laser or light passed through a pinhole is made into a parallel light beam by a collimator lens 2, enters a lens L to be examined and is refracted in accordance with the refraction characteristic thereof. A mask 3 having two slit-like openings 3a and 3b symmetrical with respect to the optical axis 10 and parallel to each other (in x-direction) is disposed near the lens L to be exaxined, and a one-dimensional detection array 4 comprising photoelectric elements arranged perpendicularly to and substantially symmetrically with respect to the optical axis and perpendicularly to the slits 3a and 3b (in y-direction) is disposed on the optical axis at a predetermined distance from the mask 3. The light passed through the mask 3 arrives at the photoarray 4 and forms two fringes $3a'$ and $3b'$ correspondingly to the two slits. The positional relation between the photoarray 4 and the fringes $3a'$, $3b'$ is such as shown in FIG. 2A when there is no cylindrical power and no prism power in the lens to be examined. If the point of intersection between the photoarray and the optical axis is chosen as the origin of the coordinates and the direction of the photoarray 4 is chosen as the y-axis and the positions at which the two fringes $3a'$ and $3b'$ intersect the photoarray are $y_1$ and $y_2$, then $y_1 = -y_2$ and the spacing $y_1-y_2$ between the fringes corresponds to the spherical power of the lens to be examined in y-direction. Said positional relation is such as shown in FIG. 2B when there is no cylindrical power but there is prism power in the lens to be examined, and the deviation P of the center of the two fringes $3a'$ and $3b'$ from the origin corresponds to the prism power and the y-axis component $(y_1+y_2)/2$ of the deviation corresponds to the component of the prism power in the direction of y-axis.

Figure 2C:
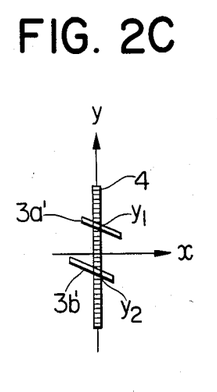

Further, in a general case where there are both cylindrical power and prism power and the cylindrical axis is not coincident with y-axis (the measuring meridian direction), said positional relation is such as shown in FIG. 2C. The spacing $y_1-y_2$ between the two fringes $3a'$ and $3b'$ corresponds to the component of the lens power in the direction of y-axis, and the central position $(y_1+y_2)/2$ of the fringes corresponds to the component of the prism power in the direction of y-axis. Thus, if the mask 3 and the photoarray 4 are rotated as a unit about the optical axis relative to the lens to be examined, the lens power and prism power in each meridian direction can be measured. When the lens power is maximum and when the lens power is minimum, the lens power in two main meridian directions is obtained and the cylindrical axis is obtained from the then position of the angle of rotation. Also, the value when the prism power is maximum is the prism power of the lens to be examined and the prism axis is obtained from the then position of the angle of rotation.

Figure 3:
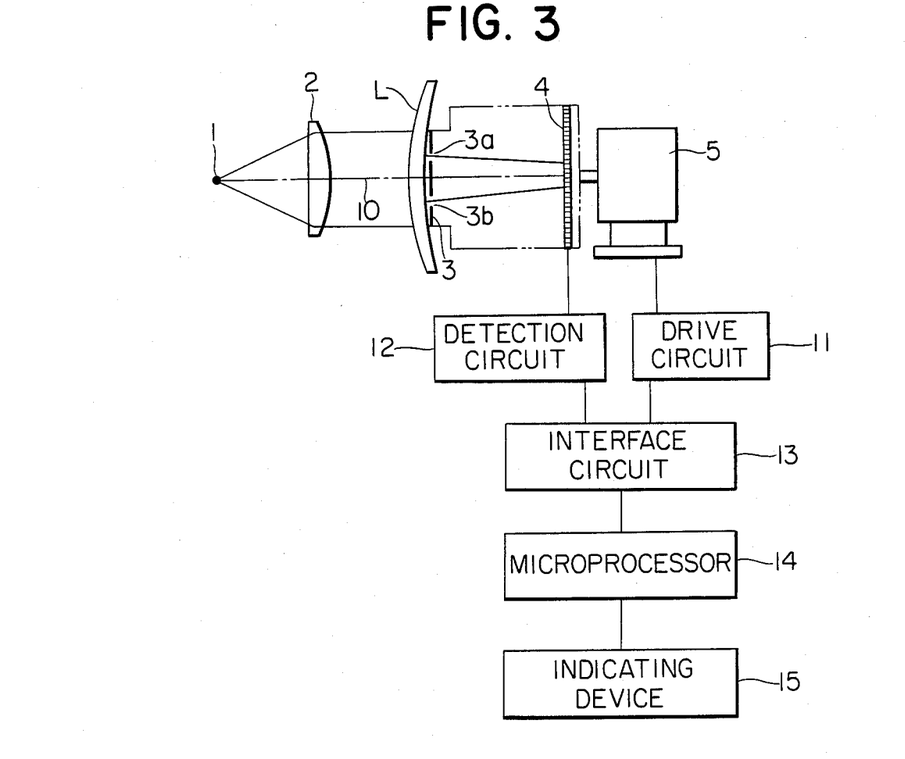
FIG. 3 schematically shows the construction of a first embodiment of the present invention.

FIG. 3 schematically shows the construction of a first embodiment based on the above-described principle. The mask 3 and the photoarray 4 are integrally mounted on the rotary shaft of a stepping motor 5 and rotatable about the optical axis 10. The stepping motor 5 is drivingly controlled by a drive circuit 11. A detection circuit 12 finds two peaks of the outputs of the photoelectric elements and detects the positions of the two fringes on the photoarray 4. The detecting circuit 12 and the drive circuit 11 are connected to a microprocessor 14 through an interface circuit 13. In the microprocessor 14, at each rotational position of the mask 3 and photoarray 4, the lens power is detected from $y_1-y_2$ and the prism power is detected from $(y_1+y_2)/2$, as previously described, and within the range of rotation of the mask 3 and photoarray 4 over at least 180°, the maximum and minimum values of $y_1-y_2$ are found, and the cylindrical power and cylindrical axis are found from the angles of rotation corresponding thereto. Also, the prism power and prism axis are found from the maximum value of the prism power and the angle of rotation corresponding thereto. These values are displayed in desired display forms by a display device or indicating device 15.

Figure 4:
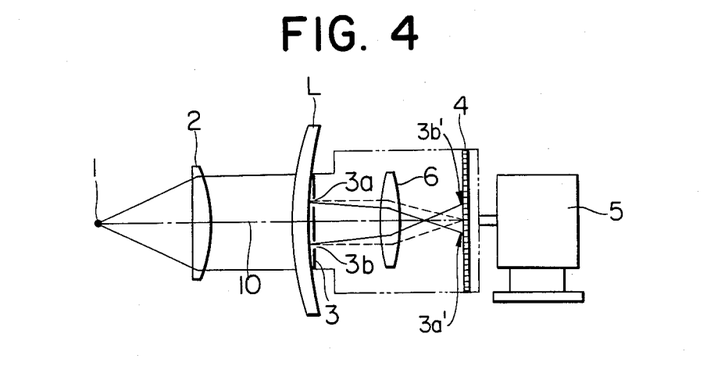
FIG. 4 schematically shows the construction of a second embodiment of the present invention.

In a second embodiment of the present invention, as schematically shown in FIG. 4, a projection lens 6 is disposed between the mask 3 and the photoarray 4 and the position of the photoarray 4 is substantially coincident with the position of the rearward focus of the projection lens 6. In FIG. 4, reference characters similar to those in FIG. 3 designate similar members and the signal processing system is substantially identical to that of the first embodiment and therefore need not be described. In this construction, when the lens L to be examined is not present in the measuring optical path or where the lens L to be examined has no refractive power, the parallel light beam emergent from the collimator lens 2 passes through the mask 3 and the projection lens 6 and is condensed at the center of the photoarray 4, i.e., on the optical axis 10. Accordingly, in this case, all of the light rays passed through the two slits 3a and 3b in the mask 3 arrive at the center of the photoarray 4 as indicated by dotted lines and thus, two fringes are not formed. If, as shown, a lens L of positive refractive power to be examined is provided adjacent to the mask 3 in the optical path, two fringes $3a'$ and $3b'$ are formed on the photoarray 4 corresponding to the slits 3a and 3b of the mask 3, as indicated by solid lines.

Where the lens L to be examined is of negative refractive power, the positions of the two fringes 3a′ and 3b′ are vertically reversed from the positions shown in FIG. 4. Accordingly, by providing such a projection lens 6, the relative spacing between the two fringes on the photoarray 4 corresponds to the absolute value of the refractive power of the lens to be examined, with zero refractive power of the lens L to be examined as the reference, and thus measurement becomes simple and accurate and the manufacture and adjustment of the apparatus becomes easy.

Figure 5:
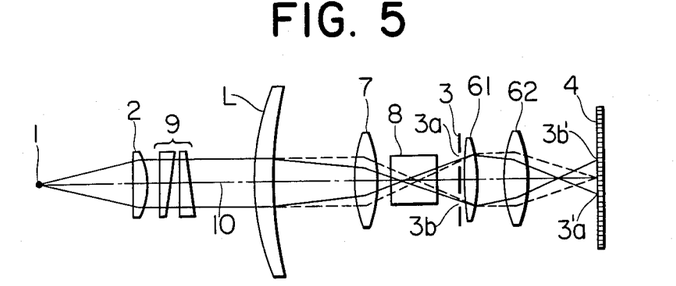
FIG. 5 is a schematic view of the optical system of a third embodiment of the present invention.

FIG. 5 is a schematic cross-sectional view showing the optical system of a third embodiment of the present invention. In this embodiment, a relay lens 7 is provided rearwardly of the lens L to be examined, and a mask 3 is provided at a position substantially conjugate with the lens L to be examined with respect to the relay lens 7. An image rotator 8 (light beam rotating means) is disposed between the relay lens 7 and the mask 3. A first positive lens 61 is provided rearwardly of and adjacent to the mask 3, and a second positive lens 62 is provided slightly spaced apart from the mask 3. The composite system comprising the first positive lens 61 and the second positive lens 62 has substantially the same function as the projection lens 6. The forward focus of the first positive lens 61 is disposed so as to be coincident with the rearward focus of the relay lens 7, and the photoarray 4 is disposed at the position of the rearward focus of the second positive lens 62. Accordingly, where the lens L to be examined is not present in the measuring optical path or where the refractive power of the lens L to be examined is zero, the light rays passed through the relay lens 7 pass through the image rotator 8, the mask 3 and the first positive lens 61 as indicated by dotted lines, whereafter they become parallel to the optical axis 10 and are condensed at the rearward focus of the second positive lens 62, i.e., at the center of the photoarray 4. Where the lens L to be examined is of positive refractive power, the light rays passed through the two slits 3a and 3b of the mask 3 arrive at the photoarray 4, as indicated by solid lines, and form fringes 3a′ and 3b′ of light thereon. Where the lens L to be examined is of negative refractive power, the positions of the two fringes 3a′ and 3b′ of light are reversed.

Figure 6A:
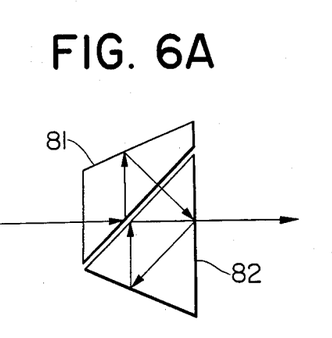
FIGS. 6A and 6B are cross-sectional views of the image rotator of FIG. 5, these Figures showing different embodiments of the image rotator.
Figure 6B:
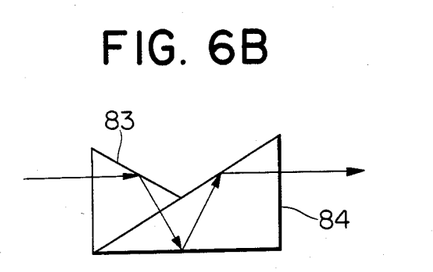

Thus, again in the present embodiment, as in the second embodiment shown in FIG. 4, the optical characteristics of the lens to be examined can be measured. The signal processing system in the present embodiment is substantially similar to that shown in FIG. 3. In the present embodiment, a similar effect is obtained by rotating the image rotator instead of revolving the stepping motor in the previous embodiment. Accordingly, the electric device including the photoarray can be fixed and therefore can be constructed simply and compactly and the manufacture of the apparatus is much easier. Also, in the present embodiment, because the mask must be disposed rearwardly of the image rotator 8 and cannot be disposed adjacent to the lens to be examined, the image of the mask 3 is formed near the vertex of the lens L to be examined by the relay lens 7 to thereby obtain the same effect. Accordingly, the mask 3 need not be disposed near the lens L to be examined, and this leads to an increased degree of freedom of the mechanical design near the lens to be examined, as well as to an advantage in that there is no danger of the mask being injured or stained by the operator. The image rotator 8 has the same function regardless of its being disposed between the lens L to be examined and the relay lens 7 or between the relay lens 7 and the mask 3, but since the measuring light beam converges near the optical axis between the relay lens 7 and the mask 3, placing the image rotator near the mask would be more convenient in that the apparatus can be made compact. Any of various conventional image rotators may be used, but it is desirable to use an image rotator comprising two prisms as shown in FIG. 6A or 6B. The image rotator of FIG. 6A has prisms 81 and 82 and comprises a so-called Pechan prism often used as an image erecting prism, with the roof surface removed therefrom, and can be constructed compactly. The image rotator of FIG. 6B is what is called an Abbe prism and this is larger than the Pechan prism, but can be manufactured more easily than the Pechan prism because it permits two prisms 83 and 84 to be cemented together.

Also, instead of the first positive lens 61 being disposed near the mask 3, the mask 3 and the first positive lens 61 may be made integral with each other. That is, the mask 3 is made to have a positive refractive power. The mask may be constructed by forming slit openings in a metal plate, but it is a common practice to deposit a slit pattern thereon by evaporation. In this case, the surface of the metal plate on which the slit pattern is not deposited by evaporation may be formed into a convex surface to provide a positive refractive power thereto, whereby the metal plate may be made to have substantially the function of the first positive lens. Further, in the above-described construction wherein the positive lens is separated, the composite system comprising the relay lens 7 and the first positive lens 61 forms an afocal system and this leads to ease of manufacture and adjustment. Alternatively, the first and second positive lenses may be replaced by a positive lens. Again in this case, if the design is such that the rearward focus of the relay lens 7 is conjugate with the center (the point of intersection with the optical axis) of the photoarray 4, $y_1 - y_2$ in the output signals of the photoarray 4, can be made zero in a case where the lens to be examined is absent in the measuring optical path or in a reference condition in which the refractive power of the lens to be examined is zero. The above-described conjugate relation and the conjugate relation of the mask 3 with the vertex of the lens L to be examined with respect to the relay lens 7 need not always be maintained strictly, but these provide the most desirable construction.

Figure 7:
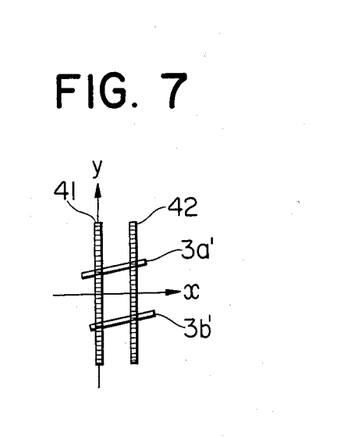
FIG. 7 is a plan view showing the positional relation between two photoarrays and fringes of light.
Figure 8:
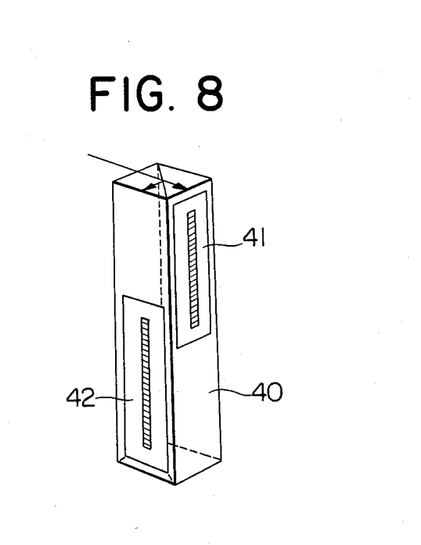
FIG. 8 is a perspective view showing a modification of the photoarray.

In the third embodiment shown in FIG. 5, a rotary prism 9 is installed between the coll lens 2 and the lens L to be examined in order to enlarge the prism power measurement range. The rotary prism is an optical member which comprises two wedge prisms and in which these two wedge prisms can be rotated oppositely to each other to thereby continuously change the prism power and the entire body of the wedge prisms can be rotated to thereby change the prism axis. In this case, the operator may manually operate the system or a servo mechanism may be added to the system to automatically operate the same.

Where the cylindrical axis and the direction of the photoarray are not coincident with each other, the fringes 3a′, 3b′ and the photoarray obliquely intersect each other as illustrated in FIG. 2C. Thus, if two photoarrays 41 and 42 parallel to each other are disposed as shown in FIG. 7, when the measuring meridian direction becomes coincident with one of the cylindrical axes of the lens to be examined, the fringes perpendicularly intersect the photoarrays 41 and 42 and therefore, the coordinates of the points of intersection with the fringes on the two photoarrays become equal. Accordingly, the cylindrical axis can be obtained by detecting this relation. According to this construction, with the detection of the extremal value of the lens power, the cylindrical axis can be measured with higher accuracy. Where the photoarray is formed, for example, by a charge coupled device (CCD), the size of the CCD commonly used is often insufficient. In that case, if the construction is as shown in FIG. 8, two CCDs can be practically seamlessly connected together longitudinally thereof. That is, substrates 41 and 42 provided with CCDs, respectively, are disposed on two optical paths branched off by a beam splitter 40.

Figure 9:
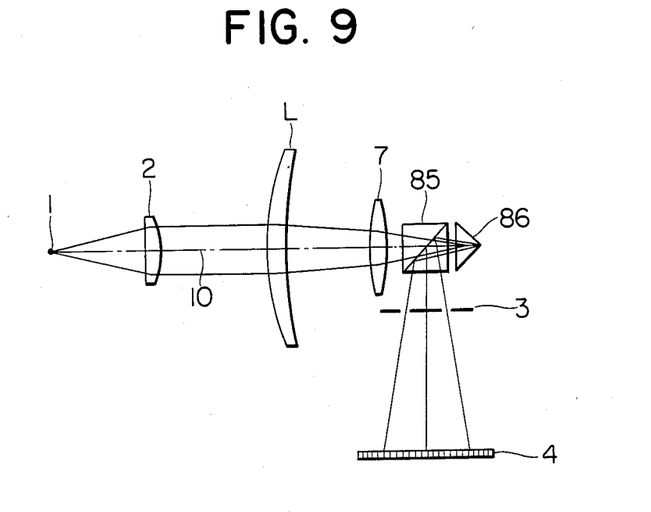
FIG. 9 is a schematic view of the optical system of a fourth embodiment of the present invention.

A fourth embodiment shown in FIG. 9 is another embodiment which uses a combination of a relay lens and an image rotator. The image rotator comprises a half-transmitting prism 85 and a right triangular prism 86. The light rays passed through the relay lens 7 are transmitted through the prism 85 and reflected by the prism 86, whereafter the light rays are reflected by the prism 85 and pass through the mask 3 to the photoarray 4. Again in this embodiment, the vicinity of the vertex of the lens L to be examined is conjugate with the mask 3 with respect to the relay lens 7. By the prism 86 being rotated about the optical axis 10 by a motor, not shown, the light beam passed through the lens L to be examined can be rotated relative to the mask 3 and photoarray 4, and as in the previous embodiments, measurement in all meridian directions of the lens L to be examined can be accomplished.

Figure 10:
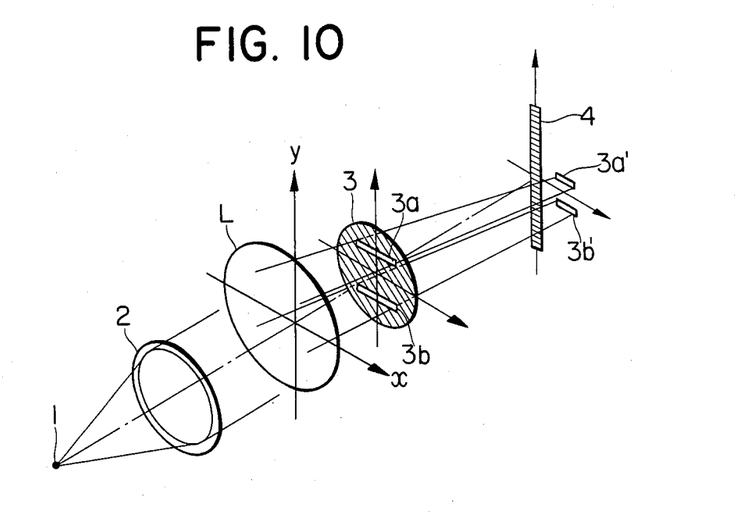
FIG. 10 is a perspective view showing the positions of fringes of light in a case where the lens to be examined is eccentric.

In each of the constructions as described above, even if the lens to be examined is disposed more or less eccentrically, if the fringes of light corresponding to the slits are on the photoarray, the optical characteristics of the lens to be examined can be measured. However, if the amount of eccentricity of the lens to be examined becomes great, the lens L to be examined has a prism action off the optical axis if not on the optical axis and therefore, as shown in FIG. 10, the fringes $3a'$ and $3b'$ of light corresponding to the slits $3a$ and $3b$ become spaced apart from the photoarray 4 to thereby make measurement impossible. Also, during measurement, each meridian direction of the lens to be examined corresponding to the photoarray 4 does not always contain the optical axis 10 and therefore, the prism action by cylindrical power is sometimes added to the prism power and, where the lens to be examined has an intense cylindrical power, errors are liable to occur to the measurement of the prism power and prism axis.

Figure 11:
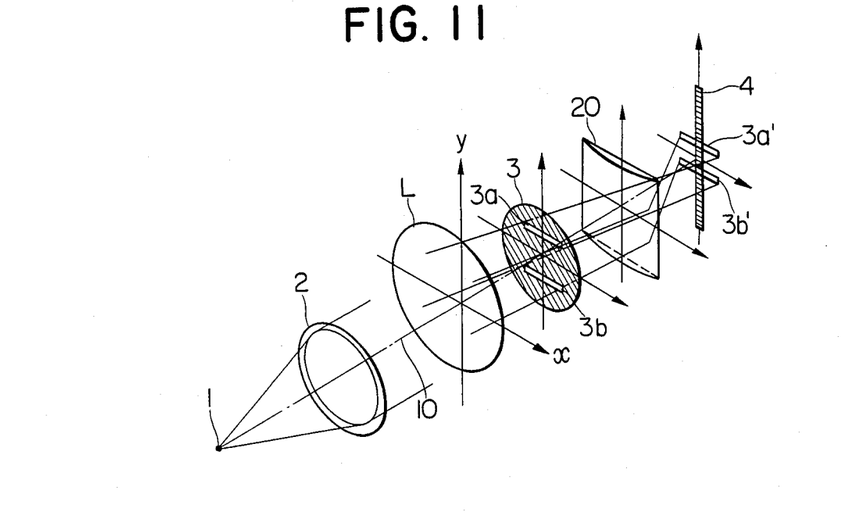
FIG. 11 is a perspective view of the optical system of a fifth embodiment of the present invention.
Figure 12A:
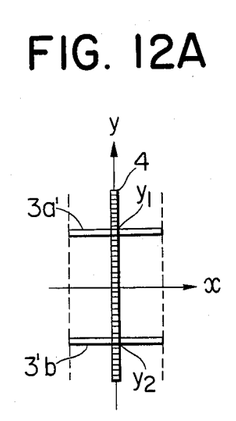
FIGS. 12A, 12B and 12C show the positional relation between the photoarray and fringes of light in the optical system of FIG. 11, FIG. 12A referring to a case where there is no cylindrical power and no prism power in the lens to be examined, FIG. 12B referring to a case where there is a prism power in the lens to be examined, and FIG. 12C referring to a case where there are a cylindrical power and a prism power in the lens to be examined and the cylindrical axis is not coincident with y-axis.
Figure 12B:
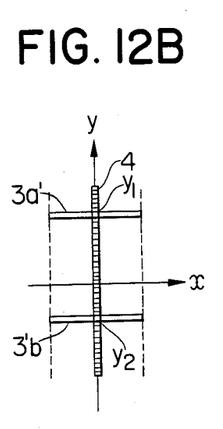
Figure 12C:
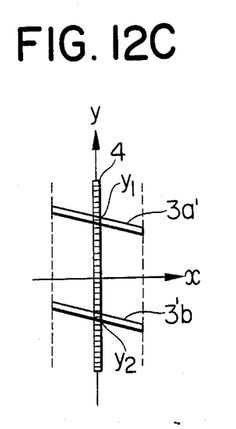

To avoid these problems, there is shown in FIG. 11 a fifth embodiment in which a cylindrical lens having a refractive power in the lengthwise direction of the slits in the mask is disposed between the mask and the photoarray and the mask and the photoarray are conjugate with each other in a plane parallel to the lengthwise direction of the slits and to the optical axis. The lens L to be examined is disposed eccentrically with respect to the optical axis 10. Assuming that the lengthwise direction of the slits $3a$ and $3b$ in the mask 3 is parallel to the x-axis, the lengthwise direction of the photoarray is parallel to the y-axis, and a cylindrical lens 20 is provided between these. The cylindrical lens has a positive refractive power in a plane containing the optical axis 10 and the x-axis and, in a plane parallel to said plane, the mask 3 and the photoarray 4 are conjugate with respect to the cylindrical lens 20. Accordingly, the light rays passed through the slits $3a$ and $3b$ are all condensed in a predetermined range of the x-axis direction from the photoarray 4 and the fringes $3a'$ and $3b'$ become no longer spaced apart from the photoarray. The state of the fringes $3a'$ and $3b'$ on the photoarray 4 in this case is such as shown in any of FIGS. 12A, 12B and 12C and, even if a prism power is added to the lens to be examined, the fringes do not incline as shown in FIGS. 2B and 2C. That is, FIG. 12A refers to a case where there is no cylindrical power and no prism power in the lens to be examined, FIG. 12B refers to a case where there is a prism power in the lens to be examined, and FIG. 12C refers to an ordinary case where there are a cylindrical power and a prism power in the lens to be examined and the cylindrical axis is not coincident with the y-axis (the measuring meridian direction). The positions $y_1$ and $y_2$ of the two fringes on the photoarray can be detected and the lens power and the prism power can be measured from, $y_1 - y_2$ and $(y_1 + y_2)/2$, respectively. The maximum value of $(y_1 + y_2)/2$ is the prism power of the lens to be examined, and the rotational angle position when $(y_1 + y_2)/2$ is a maximum value is the prism axis. In this case, the meridian direction corresponding to the photoarray 4 always contains the optical axis 10 and therefore, the prism action by cylindrical power is not exerted and thus, the prism power can be measured genuinely. For the measurement of the lens to be examined in each meridian direction, the mask 3, the cylindrical lens 20 and the photoarray 4 can be rotated as a unit about the optical axis 10.

Figure 13A:
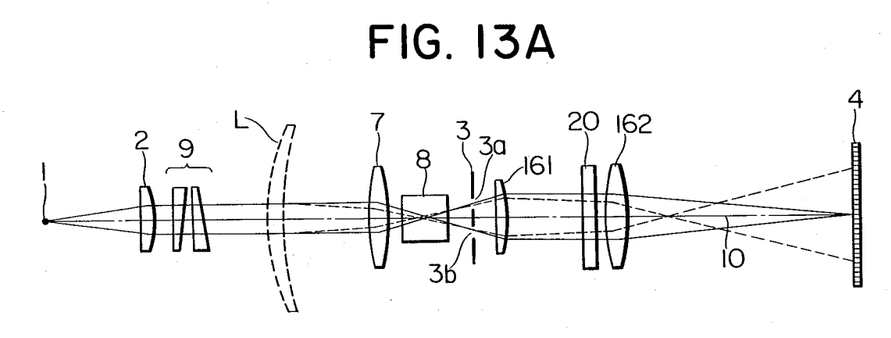
FIGS. 13A and 13B are a plan view and a side view, respectively, of the optical system of a sixth embodiment of the present invention.
Figure 13B:
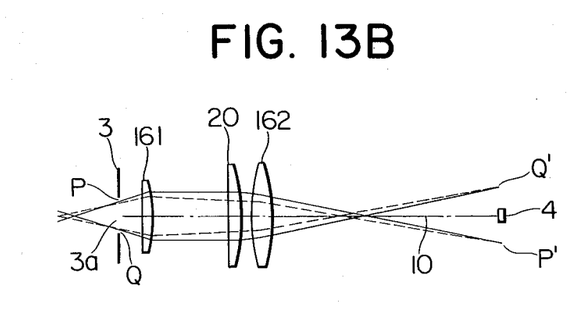

The construction of a sixth embodiment which can measure even the eccentric position of the lens to be examined by the use of such a cylindrical lens is shown in FIGS. 13A and 13B. This embodiment is of a construction in which a cylindrical lens is added to the embodiment of FIG. 5. FIG. 13A shows the optical path in a plane perpendicular to the lengthwise direction of the slits $3a$ and $3b$, namely, parallel to the photoarray 4, and FIG. 13B shows a part of the optical path in a plane parallel to the lengthwise direction of the slits $3a$ and $3b$, namely, perpendicular to the photoarray 4. The cylindrical lens 20 is disposed between a first positive lens 161 and a second positive lens 162, and has a positive refractive power only in the lengthwise direction of the slits $3a$ and $3b$. Accordingly, the cylindrical lens 20 functions as a parallel flat glass in FIG. 13A and functions as a positive lens in FIG. 13B. In FIGS. 13A and 13B, the light rays when the lens to be examined is absent are indicated by solid lines, and the light rays when the lens L to be examined having a positive refractive power is measured are indicated by dotted lines. As shown in FIG. 13B, the opposite ends P and Q of the slit $3a$ are always conjugate with positions P' and Q' symmetrical with respect to the photoarray 4, and it is seen that as viewed from this direction, the images of the slits are always at predetermined positions on the photoarray. Again in the present embodiment, if the image rotator 8 is rotated about the optical axis 10, measurement in all meridian directions of the lens to be examined are accomplished. It is also possible to make the cylindrical lens 20 and the second positive lens 162 integral with each other and construct them by a single toric lens.

Figure 14:
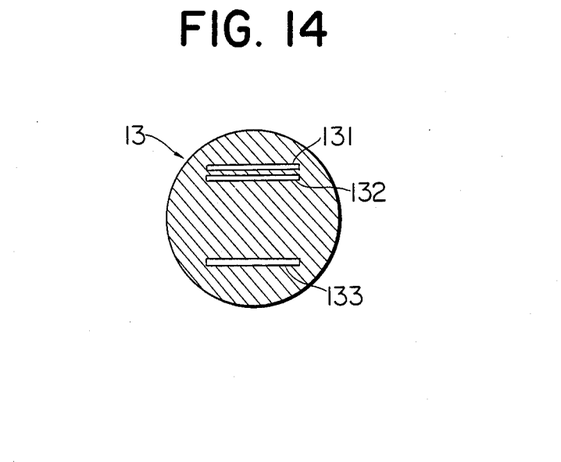
FIG. 14 is a plan view showing a modification of the mask.

In any of the above-described embodiments, two slits are provided in the mask 3, whereas the number of slits need not be limited to two but may be three or more. This is because a plurality of light positions can be detected if a one-dimensional CCD array is employed as the photoarray 4. However, the provision of too many slits would make it difficult to discriminate the correspondence thereof to the fringes on the photoarray. The mask 13 of FIG. 14 has two adjacent slits 131 and 132 in one half thereof off the center (optical axis position) thereof and has a third slit 133 parallel to the slits 131 and 132 in the other half thereof. Thus, by which slit of the mask the fringe on the photoarray is formed can be discerned. This mask is useful in that it makes it easy to discriminate whether the refractive power of the lens to be examined is positive or negative.

Figure 15:
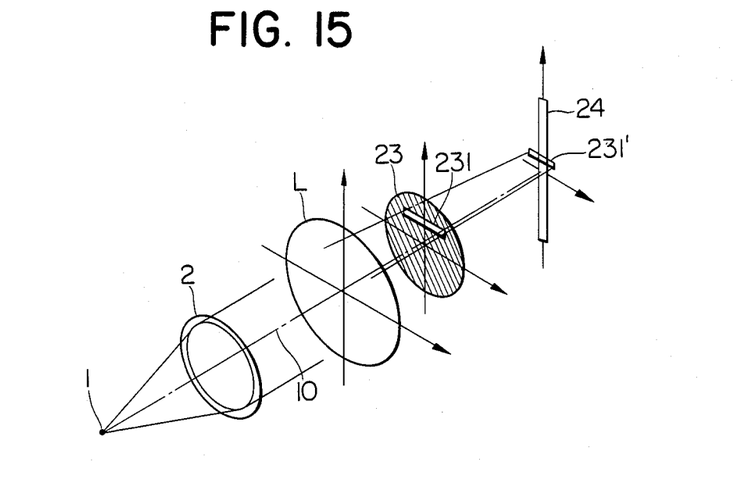
FIG. 15 is a perspective view of the optical system of an embodiment using a mask according to another modification.
Figure 16A:
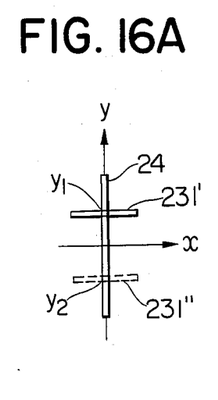
FIGS. 16A, 16B and 16C show the positional relation between the photoarray and fringes of light in FIG. 15, FIG. 16A referring to a case where the lens to be examined is a spherical lens, FIG. 16B referring to a case where the lens to be examined has a prism power, and FIG. 16C referring to a case where the lens to be examined is a lens of cylindrical power and the cylindrical axis is not coincident with the measuring meridian direction.
Figure 16B:
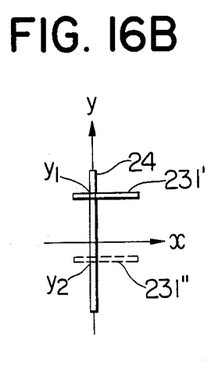
Figure 16C:
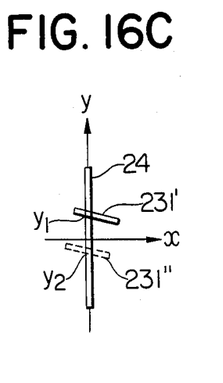

Also, even the use of a mask formed with only one slit may result in the capability of measuring the optical characteristics of the lens to be examined. The principle of this case is illustrated in FIG. 15, and the state of the fringes on the photoarray in this case is shown in FIGS. 16A–16C. The mask 23 has a slit 231 at substantially the same position as one slit 3a of the mask 3 of FIG. 1. For the measurement of a certain meridian direction, it is necessary to rotate the mask 23 and detect the positions of the fringe 231' at the beginning and end of the 180° rotation of the mask 23. FIG. 16A refers to an example of the case where the lens to be examined is a spherical lens, FIG. 16B refers to an example of the case where the lens to be examined has a prism power, and FIG. 16C refers to an example of the case where the lens to be examined is a lens of cylindrical power and the cylindrical axis thereof is not coincident with the measuring meridian direction. In these Figures, the fringe 231' at the beginning of the 180° rotation of the mask is indicated by solid line and the fringe 231" at the end of the 180° rotation of the mask is indicated by dotted line. Thus, the lens power can be detected from $y_1 - y_2$ and the prism power can be detected from $(y_1 + y_2)/2$. In the same manner as this, the mask 23 can be used to provide a construction similar to each of the aforedescribed other embodiments.

In the embodiment of FIG. 15, a one-dimensional position detecting element 24 called a position sensor is employed in place of the photoarray. The position sensor, when exposed to a light spot of appreciable size, is capable of reading out the average position thereof in a moment, but can detect only one point on the light-receiving surface at a time and therefore, it is effective with respect to the present embodiment. In order that the measurements of all optical characteristics may be completed, the fringe 231' can be rotated through 360° relative to the position sensor 24.

Figure 17:
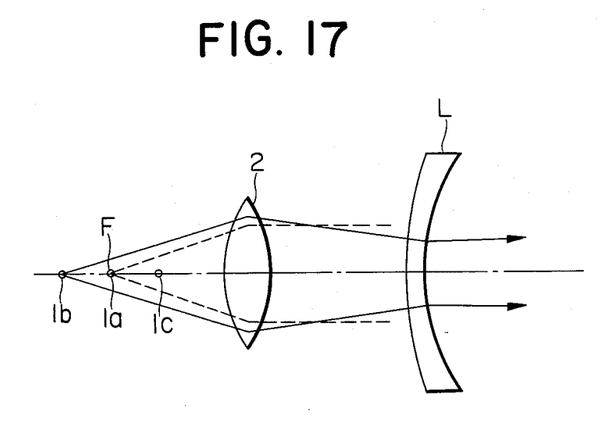
FIG. 17 is a schematic view showing the position of a light source.

In the above-described construction, a point light source and a collimator lens are used to project a parallel light beam onto the lens to be examined, but this is not restrictive. A parallel light beam is the simplest, but the measurement range can be enlarged by an off-parallel condition. For example, as shown in FIG. 17, a first light-emitting diode 1a may be provided on the forward focus F of the collimator lens 2 and a second 1b and a third light-emitting diode 1c may be provided forwardly and rearwardly of the forward focus F, and these light-emitting diodes may be selectively turned on to thereby change the position of the light source. From the light-emitting diode 1a, a parallel light beam can be supplied to the lens L to be examined, as indicated by dotted lines, but if the light-emitting diode 1b is caused to emit light, a converged light beam is supplied to the lens L to be examined, as indicated by solid lines and this is advantageous for the measurement in a case where the lens L to be examined has a strong negative refractive power. If the light-emitting diode 1c is used, a diverged light beam is supplied to the lens to be examined and this is advantageous in a case where the lens to be examined is an intensely positive lens. Such enlargement of the measurement range can also be achieved by selectively inserting a positive or negative lens between the mask and the light-receiving member. Also, if the lens to be examined is disposed at the rearward focus position of the collimator lens, the relation between the position of the light source and the diopter of the light beam entering the lens to be examined becomes conveniently linear.

In the foregoing description, the mask has been shown as being provided with slit-like openings, but use may also be made of a construction in which the slit-like portions are made into light-intercepting portions and light is transmitted through the other portion. In such case, the light-receiving member detects not the light line but the dark line of light.

What I claim is:

1. An apparatus for measuring the optical characteristics of an optical system to be examined, comprising:
    (a) beam supply means for determining a reference optical axis and generating a light beam passed through said optical system to be examined along said reference optical axis;
    (b) mask means for partly transmitting said light beam therethrough, said mask means having a pattern comprising at least one straight line disposed off said reference optical axis in said light beam, the straight line of said pattern extending in a predetermined direction in a plane substantially orthogonal to said reference optical axis;
    (c) photosensitive detector means for receiving the light beam passed through said optical system to be examined and said mask means, said detector means being fixedly disposed relative to said mask means and having a substantial length in a direction substantially orthogonal to said pattern, said detector means producing an electrical signal indicative of the position of the pattern of said mask means projected onto said detector means in the direction of the length of said detector means;
    (d) rotating means for providing relative rotation about said reference optical axis between said light beam passed through said optical system to be examined and said mask means;
    (e) means for processing said electrical signal and finding the refractive characteristic of said optical system to be examined; and
    (f) optical means provided between said mask means and said detector means for making said mask means and said detector means conjugate in a plane parallel to the direction of the straight line of said pattern and said reference optical axis.

2. An apparatus according to claim 1, wherein said optical means includes a cylindrical lens having a positive power in said plane.

3. An apparatus for measuring the optical characteristics of an optical system to be examined, comprising:
    (a) beam supply means for determining a reference optical axis and generating a light beam passed through said optical system to be examined along said reference optical axis;
    (b) mask means for partly transmitting said light beam passed through said optical system to be examined, said mask means having a pattern comprising first and second straight lines which are parallel to each other and are disposed at opposite sides of said reference optical axis in said light beam, said first and second straight lines extending in a predetermined direction in a plane substantially orthogonal to said reference optical axis;

(c) photosensitive detector means for receiving the light beam passed through said optical system to be examined and said mask means, said detector means being fixedly disposed relative to said mask means and having a substantial length in a direction substantially orthogonal to said reference optical axis and said predetermined direction, said detector means producing an electrical signal indicative of the respective positions of images of said first and second straight lines projected onto said detector means in the direction of the length of said detector means;

(d) rotating means for providing relative rotation about said reference optical axis between said light beam passed through said optical system to be examined and said mask means; and (e) means for processing said electrical signal and finding the refractive characteristic of said optical system to be examined, wherein, if $y_1$ and $y_2$ represent coordinate positions of said images of said first and second straight lines on said detector means, said processing means determines the lens power of two main meridian directions of said optical system to be examined from the maximum value and minimum value of $(y_1-y_2)$ and determines the prism power of said optical system to be examined from the maximum value of $(y_1+y_2)/2$, respectively, during the relative rotation by said rotating means.

4. An apparatus according to claim 3, wherein said processing means detects the degree of the relative rotation by said rotating means and determines the cylindrical axis of said optical system to be examined from the degree at which $(y_1-y_2)$ reaches one of the maximum and the minimum and determines the prism axis of said optical system to be examined from the degree at which $(y_1+y_2)/2$ reaches the maximum, respectively, during said relative rotation.

5. An apparatus according to claim 3, wherein said rotating means provides relative rotation of at least 180° between said light beam and said mask means.

6. An apparatus according to claim 3, wherein said first and second straight lines are disposed symmetrically about said reference optical axis.

7. An apparatus according to claim 6, wherein said mask means has a pattern further including a third straight line disposed adjacent and parallel to said first straight line.

8. An apparatus according to claim 3, wherein said mask means is formed by a combination of a light-transmitting area and a light-intercepting area formed in the same plane substantially orthogonal to said reference optical axis.

9. An apparatus according to claim 3, wherein said detector means is disposed in intersecting relationship with said reference optical axis and wherein said apparatus further comprises a projection lens disposed between said mask means and said detector means for causing the light beam passed through said mask means to be imaged at the point of intersection with said reference optical axis on said detector means when said optical system to be examined is absent.

10. An apparatus accord to claim 9, wherein said optical system to be examined is disposed between said beam supply means and said mask means and wherein said apparatus further comprises a relay lens having a positive power between said optical system to be examined and said mask means, said optical system to be examined and said mask means are disposed at positions substantially conjugate with respect to said relay lens, and said projection lens is disposed at a position where the rearward focus of said relay lens and the point of intersection with said reference optical axis on said detection means are substantially conjugate with respect to said projection lens.

11. An apparatus according to claim 10, wherein said rotating means includes prism means disposed near the rearward focus of said relay lens and causing said light beam to enter thereinto and reflecting it a plurality of times therein and thereafter causing it to emerge therefrom, and rotated about said reference optical axis to rotate said emerging light beam relative to the entering light beam.

12. An apparatus according to claim 3, further comprising optical means provided between said mask means and said detector means for making said mask means and said detector means conjugate in a plane parallel to the direction of said first and second straight lines of said pattern and said reference optical axis.

13. An apparatus according to claim 12, wherein said optical means includes a cylindrical lens having a positive power in said plane.

14. An apparatus for measuring the optical characteristics of an optical system to be examined, comprising:

(a) beam supply means for determining a reference optical axis and generating a light beam passed through said optical system to be examined along said reference optical axis;

(b) mask means for partly transmitting said light beam passed through said optical system to be examined, said mask means having a pattern comprising a straight line disposed off said reference optical axis in said light beam, the straight line of said pattern extending in a predetermined direction in a plane substantially orthogonal to said reference optical axis;

(c) photosensitive detector means for receiving the light beam passed through said optical system to be examined and said mask means, said detector means having a substantial length in a direction substantially orthogonal to said reference optical axis and the straight line of said pattern, said detector means producing an electrical signal indicative of the position of said straight line projected onto said detector means in the direction of the length of said detector means, said mask means and said detector means having first and second relative rotation positions displaced by 180° about said reference optical axis;

(d) rotating means for providing relative rotation about said reference optical axis between said light beam passed through said optical system to be examined and said mask means, the projection image of said straight line being formed a coordinate position $y_1$ on said detector means at said first relative rotation position, and the projection image of said straight line being formed at a coordinate position $y_2$ on said detector means at said second relative rotation position; and (e) means for processing said electrical signal and finding the refractive characteristic of said optical system to be examined, said processing means determining the lens power of two main meridian directions of said optical system to be examined from the maximum value and the minimum value of $(y_1-y_2)$ and determining the prism power of said optical system to be examined from the maximum value of $(y_1-y_2)/2$, respectively, during said relative rotation by said rotating means.

15. An apparatus according to claim 14, wherein said processing means detects the degree of the relative rotation by said rotating means and determines the cylindrical axis of said optical system to be examined from the degree at which $(y_1-y_2)$ reaches one of the maximum and the minimum and determines the prism axis of said optical system to be examined from the degree at which $(y_1+y_2)/2$ reaches the maximum, respectively, during said relative rotation.

16. An apparatus according to claim 14, wherein said rotating means provides relative rotation of at least 360° between said light beam and said mask means.

17. An apparatus according to claim 14, wherein said mask means is formed by a combination of a light-transmitting area and a light-intercepting area formed in the same plane substantially orthogonal to said reference optical axis.

18. An apparatus according to claim 14, wherein said detector means is disposed in intersecting relationship with said reference optical axis and wherein said apparatus further comprises a projection lens disposed between said mask means and said detector means for causing the light beam passed through said mask means to be imaged at the point of intersection with said reference optical axis on said detector means when said optical system to be examined is absent.

19. An apparatus according to claim 18, wherein said optical system to be examined is disposed between said beam supply means and said mask means and wherein said apparatus further comprises a relay lens having a positive power between said optical system to be examined and said mask means, said optical system to be examined and said mask means are disposed at positions substantially conjugate with respect to said relay lens, and said projection lens is disposed at a position where the rearward focus of said relay lens and the point of intersection with said reference optical axis on said detection means are substantially conjugate with respect to said projection lens.

20. An apparatus according to claim 19, wherein said rotating means includes prism means disposed near the rearward focus of said relay lens and causing said light beam to enter thereinto and reflecting it a plurality of times therein and thereafter causing it to emerge therefrom, and rotated about said reference optical axis to rotate said emerging light beam relative to the entering light beam.

21. An apparatus according to claim 14, further comprising optical means provided between said mask means and said detector means for making said mask means and said detector means conjugate in a plane parallel to the direction of the straight line of said pattern and said reference optical axis.

22. An apparatus according to claim 21, wherein said optical means includes a cylindrical lens having a positive power in said plane.

23. An apparatus for measuring the optical characteristics of an optical system to be inspected, comprising:
    (a) a collimating optical system having an optical axis and a predetermined focal point and capable of converting a light beam diverging from said focal point into a parallel beam;
    (b) light generating means for selectively generating light from either one of at least two positions on the optical axis of said collimating optical system;
    (c) mask means positioned opposite to said light source means with respect to said collimating optical system, wherein said mask means comprises a pattern composed of light transmitting and opaque areas, said pattern having at least one straight line disposed off the optical axis of said collimating optical system;
    (d) means for placing said optical system to be inspected on the optical axis of said collimating optical system in such a manner as to guide light from said light generating means through said collimating optical system to said mask means; and
    (e) detection means with a photoreceptor plane used for detecting the intensity distribution on said photoreceptor plane, said detection means receiving the light beam passed through said optical system to be inspected and said mask means.

24. An apparatus according to claim 23, wherein said two positions are at opposite sides of said focal point and said light-generating means comprises a light source at each of said positions, respectively.

25. An apparatus according to claim 24, wherein said light-generating means comprises means for driving said two light sources selectively.

26. An apparatus according to claim 23, wherein said light-generating means comprises a first light source positioned at said focal point and a second light source positioned away from said focal point.

27. An apparatus according to claim 23, wherein said photoreceptor plane is fixedly disposed relative to said mask means and has a substantial length in a direction substantially orthogonal to said axis of said collimating optical system and the straight line of said pattern, said detection means producing an electrical signal indicative of the position of the pattern of said mask means projected onto said photoreceptor plane in the direction of the length of said photoreceptor plane.

28. An apparatus according to claim 27, further comprising rotating means for providing relative rotation about said axis of said collimating optical system between said light beam passed through said optical system to be inspected and said mask means; and
    means for processing said electrical signal and finding the refractive characteristic of said optical system to be inspected.

* * * * *